(12) United States Patent
Vroom

(10) Patent No.: US 6,904,903 B1
(45) Date of Patent: Jun. 14, 2005

(54) CONVECTION STEAMER WITH FORCED RECIRCULATION THROUGH STEAM BATH

(75) Inventor: Robert C. Vroom, Fuquay-Varina, NC (US)

(73) Assignee: Middleby-Marshall, Inc., Elgin, IL (US)

( * ) Notice: Subject to any disclaimer, the term of this patent is extended or adjusted under 35 U.S.C. 154(b) by 459 days.

(21) Appl. No.: 10/200,646

(22) Filed: Jul. 22, 2002

(51) Int. Cl.⁷ .................................. A21B 1/08
(52) U.S. Cl. .................. 126/20; 126/21 A; 126/273 R; 219/400; 219/401
(58) Field of Search ............... 126/20, 21 R, 126/21 A, 19 M, 273 R; 219/400, 401, 405, 219/409, 403; 99/474, 483, 447, 468, 477, 99/339; 426/418, 446, 523, 506, 419, 510

(56) References Cited

U.S. PATENT DOCUMENTS

| | | | |
|---|---|---|---|
| 3,604,895 A * | 9/1971 | MacKay | ..................... 219/401 |
| 3,873,806 A | 3/1975 | Schossow | |
| 3,991,737 A | 11/1976 | Del Fabbro | |
| 4,244,979 A * | 1/1981 | Roderick | ..................... 426/418 |
| 4,426,923 A | 1/1984 | Ohata | |
| 4,509,412 A | 4/1985 | Whittenburg et al. | |
| 4,585,661 A | 4/1986 | Brummett | |
| 4,655,192 A | 4/1987 | Jovanovic | |
| 4,920,251 A | 4/1990 | Whitenack et al. | |
| 5,549,038 A | 8/1996 | Kolvites | |
| 5,558,010 A * | 9/1996 | Shelton | ........................ 99/468 |
| 5,631,033 A | 5/1997 | Kolvites | |
| 5,636,622 A | 6/1997 | Urcelay Amondarain et al. | |
| 5,653,164 A | 8/1997 | Vallee | |
| 5,968,388 A | 10/1999 | Creamer | |
| 6,157,006 A | 12/2000 | Sickles et al. | |
| 6,323,464 B1 | 11/2001 | Cohn | |
| 6,658,995 B1 * | 12/2003 | DeYoung et al. | .............. 99/468 |

\* cited by examiner

Primary Examiner—James C. Yeung
(74) Attorney, Agent, or Firm—Coats & Bennett, P.L.L.C.

(57) ABSTRACT

A convection steam cooking device utilizes forced recirculation of gases along a primary recirculation path that extends through a steam chamber so that gases from the cooking cavity flow through the steam chamber and are subjected to a "steam bath" that alters the gases by adding heat and/or moisture. The cooking device includes a cooking cavity, a fan, a steam chamber disposed beneath the cooking cavity with a lower pool area for holding water and an upper steam collecting area disposed directly above the pool area, and a removable baffle disposed between the cooking cavity and the steam chamber with a perforated section remote from the fan and disposed at an upward angle. The primary forced recirculation path extends from the main cooking cavity, through the baffle, substantially across the steam collecting area, through a duct to the fan, and back to the main cavity.

32 Claims, 4 Drawing Sheets

CONVECTION STEAMER WITH FORCED RECIRCULATION THROUGH STEAM BATH

BACKGROUND OF THE INVENTION

The present invention relates generally to the field of cooking devices, and specifically to commercial steam cooking devices.

Modern steam ovens operate by heating water to generate steam and then supplying the steam to a cooking cavity containing food. Some of these steam ovens operate at low pressures, slightly above atmospheric, while others are openly vented to atmosphere. For either arrangement, one problem is ensuring the proper distribution of steam within the cooking cavity for optimum cooking. Some limited efforts have been made to use forced recirculation of the air/steam mixture in the cooking cavity, such as by using a recirculation fan connected to the cooking cavity, in order to make the cooking more efficient. The recirculation path for such units is typically simply from the cooking cavity directly to the fan and then back to the cooking cavity. Such units supply steam to the cooking cavity, typically by injecting steam directly into the cooking cavity via some route that is separate from any recirculation path. For instance, new steam may be generated in a separate steam chamber and then piped directly into the cooking cavity. Such arrangements are believed to provide rather inefficient heat transfer, particularly if the new "hot" steam is not thoroughly mixed with the older "cooler" steam already supplied to the cooking cavity.

SUMMARY OF THE INVENTION

A convection steam cooking device of the present invention utilizes forced recirculation of gases from the cooking cavity through a primary recirculation path that extends through a steam chamber. As the gases from the cooking cavity flow through the steam chamber, they are subjected to a "steam bath" that alters the gases by adding heat and/or moisture to the gases. By directing the primary recirculation path through the steam chamber, a more efficient cooking process is achieved.

One embodiment of the convection steam cooking device includes a cooking cavity and a fan operatively communicating with the cooking cavity. The steam chamber is disposed beneath the cooking cavity and has a lower pool area for holding water therein and an upper steam collecting area. The steam collecting area is advantageously disposed directly above the pool area and directly below the cooking cavity. The pool area may have a first horizontal cross-sectional area and the steam collecting area may have a horizontal cross-sectional area substantially equal to the horizontal cross-sectional area of the pool area, with substantially unrestricted access from the pool area to the steam collecting area.

The steam chamber is connected between the cooking cavity and the fan along the primary recirculation path. As such, the primary recirculation path extends from the main cooking cavity, through the steam collecting area, to the fan, and back to the main cavity. This routing of the primary recirculation path provides forced flow of the gases from the cooking cavity through the steam chamber, where they can be heated and/or moistened. Preferably, the steam chamber includes an inlet disposed away from the fan and an outlet disposed toward the fan, and a generally vertically extending duct operatively disposed between the outlet and the fan. In addition, the device preferably includes a baffle disposed between the cooking cavity and the steam chamber, with the baffle at least partially defining the inlet and the outlet of the steam chamber and substantially forming the floor of the cooking chamber. The baffle is preferably easily removable such that removal of the baffle allows access by a user from the cooking cavity to at least a portion of the steam chamber, such as for cleaning purposes. The baffle typically includes a secondary section remote from the fan and a generally flat main section disposed between the secondary section and the fan. The secondary section may be advantageously disposed at an upward angle with respect to the generally flat main section and include a plurality of holes defining the inlet to the steam chamber. The primary recirculation path for such embodiments extends from the main cooking cavity, through inlet to the steam collecting area, substantially across the steam collecting area, through the outlet, through the duct to the fan, and back to the main cavity. There may also be a secondary recirculation path from the cooking cavity to the fan and back to the cooking cavity, without passing through the steam chamber.

One method of treating food with steam according to the present invention includes generating steam in a steam chamber disposed beneath a main cooking cavity and having a having a lower pool area for holding water therein and an upper steam collecting area; routing the steam from the steam collecting area to the main cooking cavity along at least a portion of a primary recirculation path, the primary recirculation path extending from the main cooking cavity, through the steam collecting area, to a fan, and back to the main cavity; and forcing recirculation of the steam along the primary recirculation path so that gases from the main cooking cavity flow through the steam collecting area to be enhanced therein. The enhancement includes adding heat and/or moisture to the gases passing through the steam chamber. The method may also include providing a baffle between the main cooking cavity and the steam chamber that helps define a lower boundary of the cooking cavity and an upper portion of the steam chamber. The baffle may include a plurality of holes disposed away from the fan, and the routing of steam to the main cooking cavity along the primary recirculation path may include routing the steam to the main cooking cavity from the main cooking cavity, through the holes of the baffle to the steam collecting area, through the steam collecting area, to the fan, and back to the main cavity. The baffle typically includes a secondary section remote from the fan and a generally flat section disposed between the secondary section and the fan; the flat section may be used to catch drippings from the food in the cooking cavity.

DETAILED DESCRIPTION OF THE INVENTION

Figure 1:
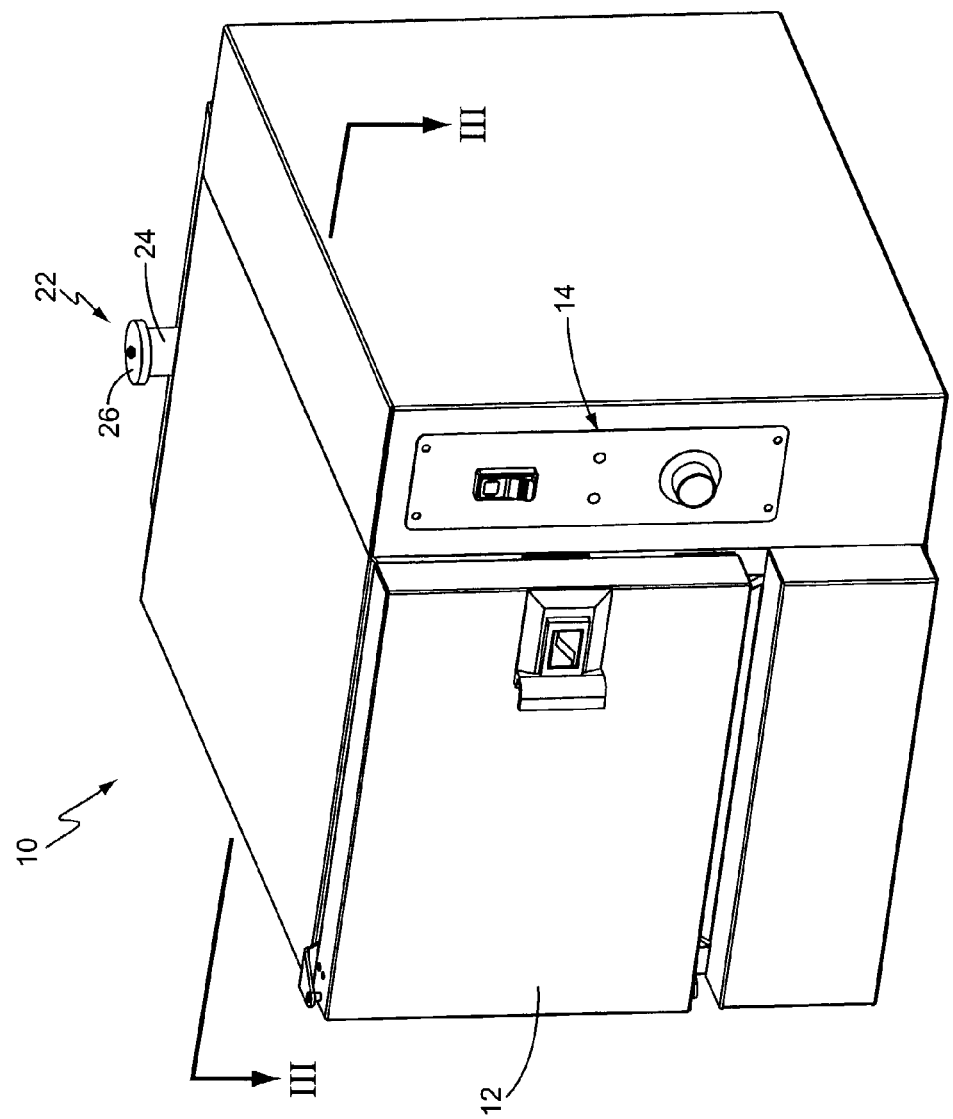
FIG. 1 is a perspective view of one embodiment of a convection steamer cooking device according to the present invention.
Figure 2:
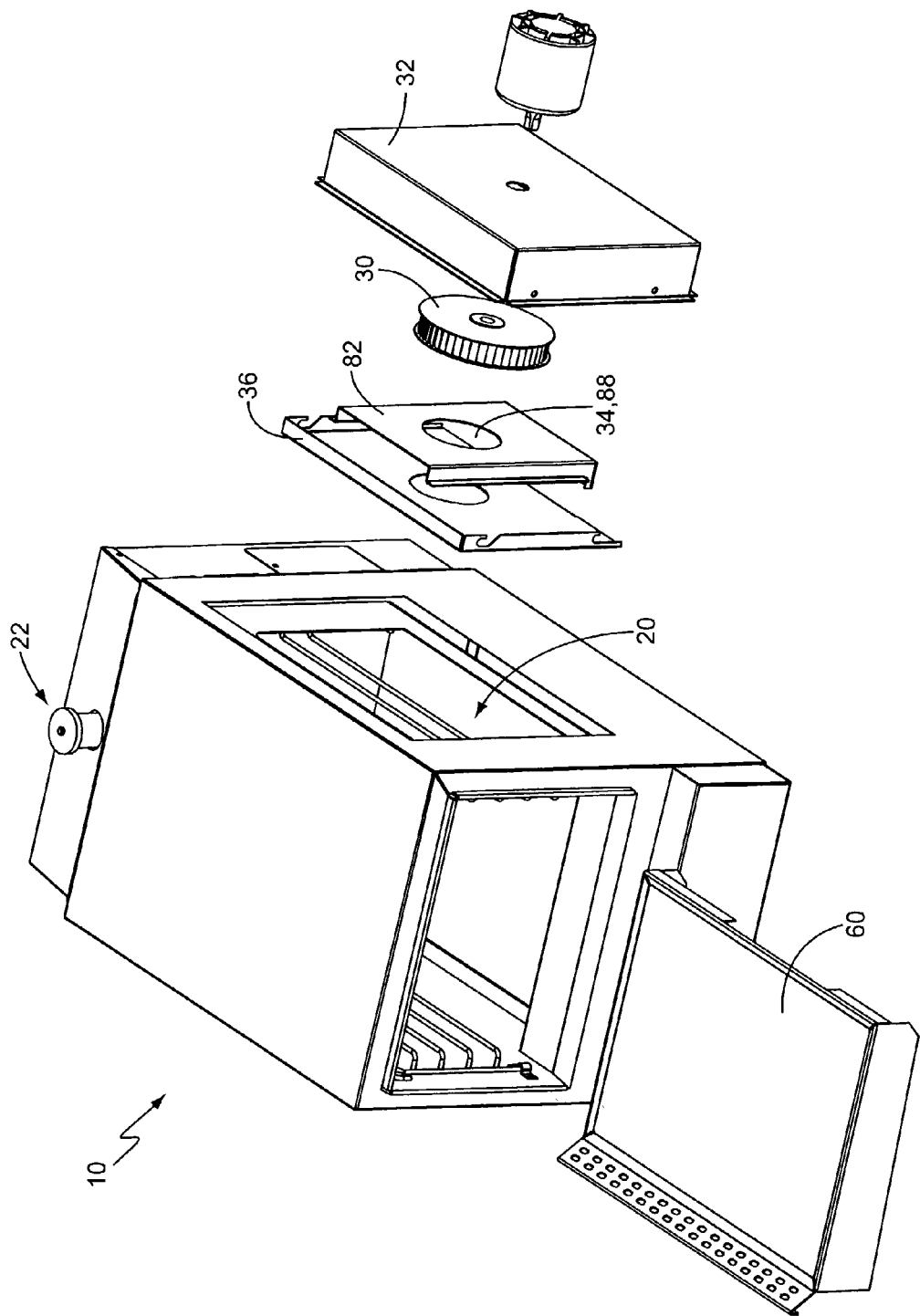
FIG. 2 is a partially exploded view of the cooking device of FIG. 1.

One embodiment of a cooking device according to the present invention, sometimes referred to herein as a convection steamer, or simply a steamer, is shown in FIGS. 1–2 and generally indicated at 10. From outward appearance, the steamer 10 may appear similar to steamers currently available on the market. Indeed, as is typical for such devices, the steamer 10 includes a latched door 12 for providing access to the cooking cavity 20 (see FIG. 2) and controls 14 to control the operation of the steamer 10. The controls 14 may take any form known in the art, and typically include an on/off switch, indicator lights, a timer and/or thermostat, and other suitable electronics. The electronics of the controls 14 may be segregated from cooking cavity 20 and may be advantageously vented to the ambient atmosphere for cooling. The cooking cavity 20 typically takes the form of a substantially rectangular chamber with racks for supporting food trays as is known in the art. In the present invention, the cooking cavity 20 may be vented to the atmosphere via an exhaust system 22 that typically includes an exhaust duct 24 and associated cap 26. The cap 26 acts as a slight damper on the venting of gases from the cooking cavity 20. However, once the pressure in the cooking cavity 20 reaches a sufficient level to overcome the weight of the cap 26, the cap 26 is displaced in a "burping" action that vents some gases from the cooking cavity 20, thereby preventing significant build-up of pressure therein. In preferred embodiments, the cap 26 is designed to prevent the build-up of pressures more than slightly above atmospheric in the cooking cavity 20, such as of not more than about five inches of water. As such, no special pressure vessel structure or certification should be required for the steamer 10.

Unlike the majority of commercial steamers available on the market, the steamer 10 of the present invention includes a fan 30 for forced recirculation of the gases in the cooking cavity 20. In some embodiments of the present invention, the fan 30 is located to one side of the cooking cavity 20, preferably on the side of the controls 14 to conserve space. The fan 30 may take the form of a common centrifugal fan 30 with a horizontal rotational axis, but this is not required. The fan 30 is typically surrounded by a suitable shroud 32, but connects to the cooking cavity 20 as described more fully below.

In addition, the steamer 10 of the present invention includes a steam chamber 40 located below the cooking cavity 20 (see FIG. 3). The steam chamber 40 includes a pool area 42 in a lower portion and a steam collecting area 50 in its upper portion. The pool area 42 holds the fluid, typically water, that is used to generate steam 5. It is preferred that the cooking device 10 be connected to a suitable water supply line, and that the water level 44 in the pool area 42 be automatically controlled, such as via suitable float valves and overflow outlets and/or electronic water level controls, in a manner well known in the art. One or more heating elements 16 are provided, advantageously directly below the pool area 42, to supply sufficient heat to the pool area 42 so as generate steam and/or heat as needed. The operation of the heating element 16 may be controlled in any fashion known in the art.

The steam collecting area 50 is disposed above the pool area 42. Steam 5 generated by the heated water in the pool area 42 naturally rises into the steam collecting area 50. The steam collecting area 50 includes at least one inlet 52 and at least one outlet 54. It is intended that there will be forced flow through the steam collecting area 50, as described further below.

Figure 4:
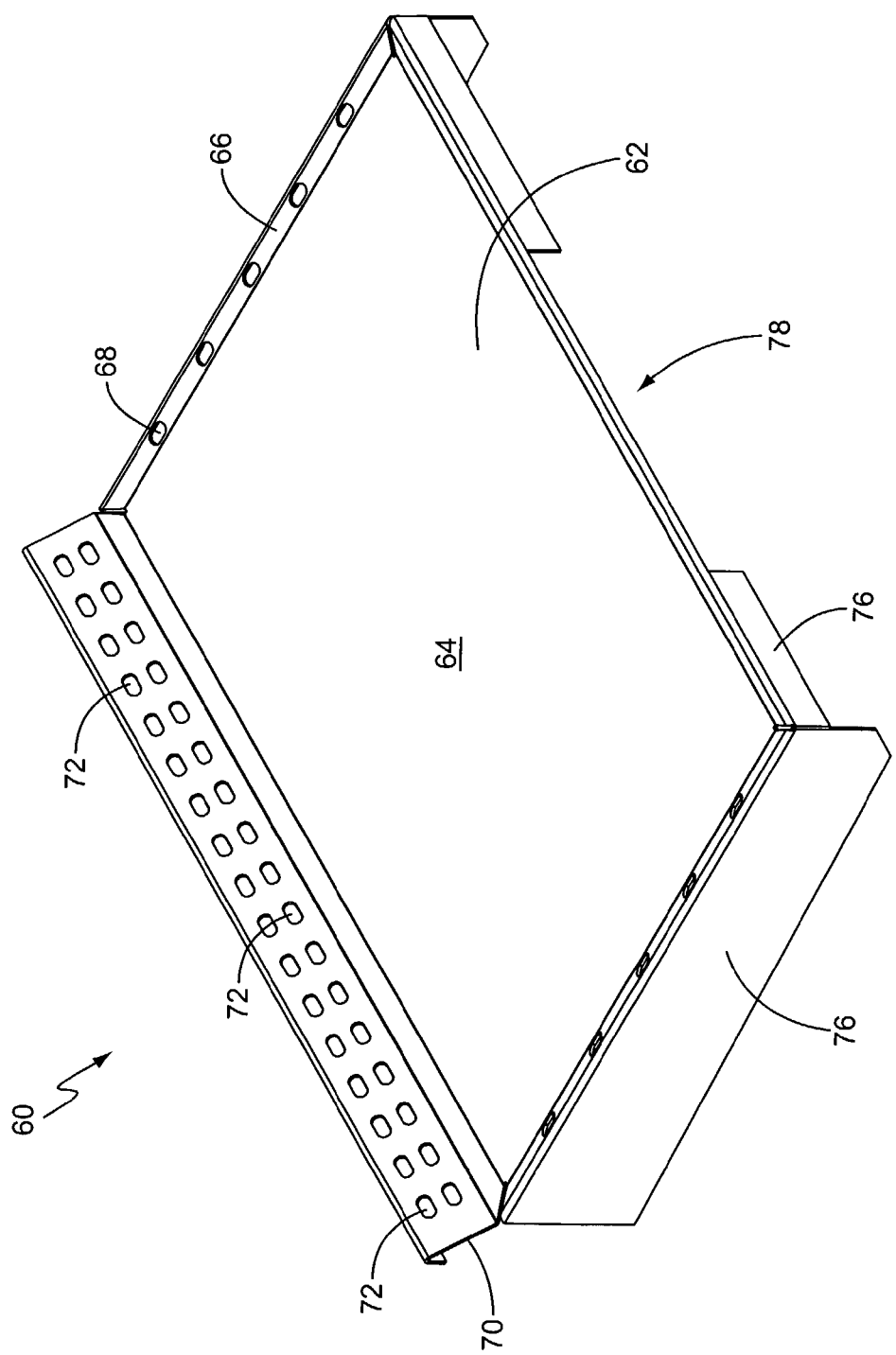
FIG. 4 is a more detailed perspective view of the baffle shown in FIG. 2.

The steam chamber 40 is separated from the cooking cavity 20 by the baffle 60 that may advantageously form the "floor" of the cooking cavity 20 and the "ceiling" of the steam chamber 40. As shown in FIG. 2 and FIG. 4, the baffle 60 typically includes a generally flat main section 62, a secondary section 70, and a plurality of downwardly extending flanges 76. The main section 62 may advantageously include a central depression 64 ringed by a raised rim 66. This depression 64 is intended to catch any drippings or the like from the food being cooked, preventing such matter from entering the steam chamber 40. The secondary section 70 preferably extends substantially across the respective side of the baffle 60, and includes a plurality of primary holes 72 that connect the cooking cavity 20 to the steam chamber 40, and thereby act as the main inlet 52 to the steam collecting area 50. The secondary section 70 is preferably angled upward with respect to the main section 62 so as to allow for greater cross sectional area of the primary holes 72 (without increasing the footprint of the cooking device) and to promote recirculation flow along the main section 62 of the baffle 60. The flanges 76 may take any desired shape, but the flange closest the fan 30 preferably includes a cutout 78, whose purpose is described more fully below. The baffle 60 may advantageously be readily removable from the cooking device 10 to allow access by a user from the cooking cavity 20 to at least a portion of the steam chamber 40 for cleaning purposes.

Figure 3:
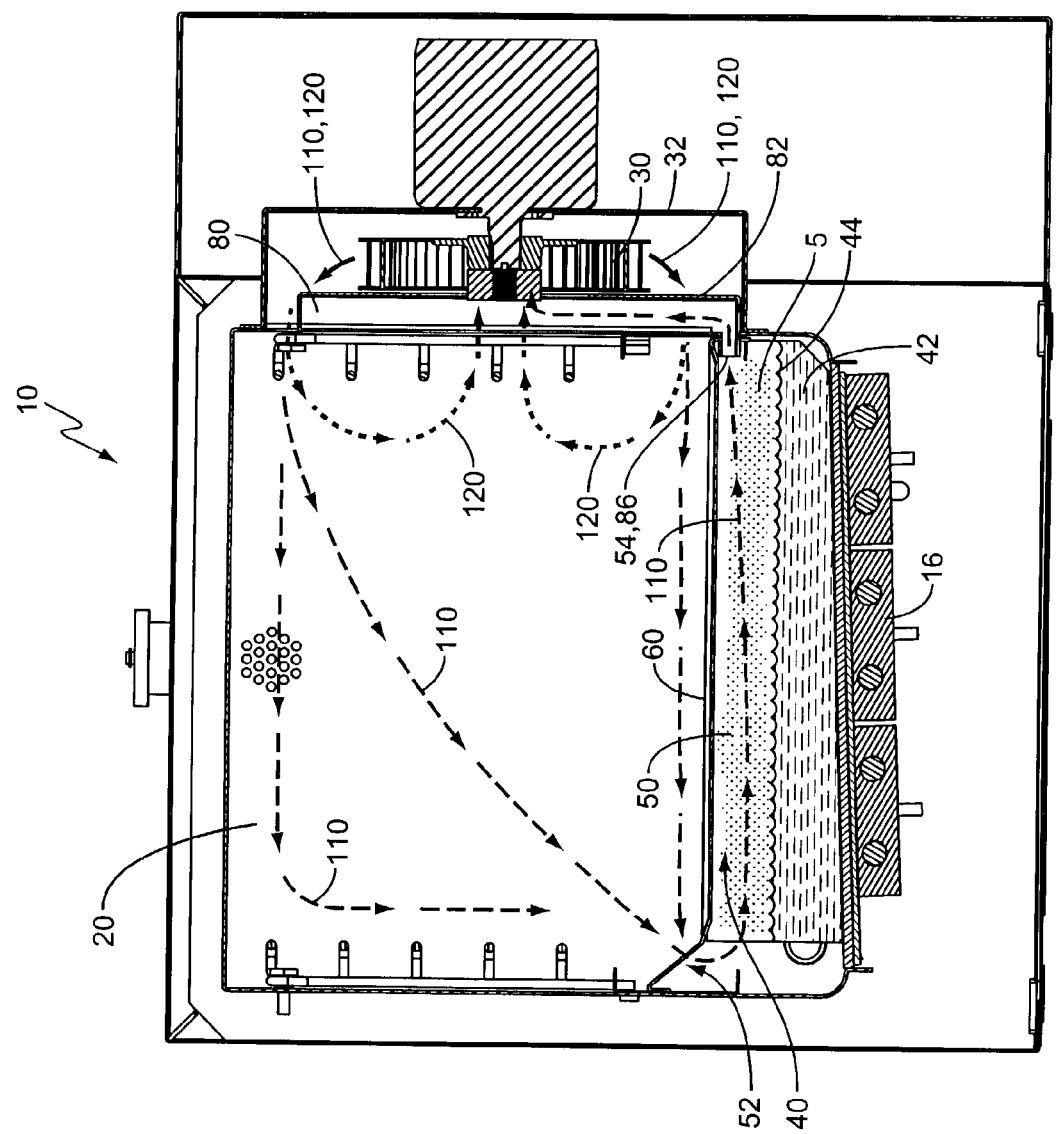
FIG. 3 is a sectional view of the cooking device of FIG. 1 along line III—III illustrating the primary recirculation flow path and the secondary recirculation flow path.

As shown in FIGS. 2–3, there may be a duct 80 connecting the steam collecting area 50 to the fan 30. This duct 80, which advantageously is disposed vertically, may be defined as the space between panel 36 forming a side wall of the cooking cavity 20 and another panel 82 spaced therefrom towards the fan 30. At least panel 82, and advantageously both panels 36,82, may include a suitable opening 34 for allowing the flow of air therethrough to the center of the fan 30. The opening 34 in panel 82 acts as the outlet port 88 for the duct 80. The panel 82 may include a L-shaped lower section to help form an inlet port 86 that extends below panel 36 and connects to steam chamber 40 via cutout 78, forming the outlet 54 of the steam chamber 40. It should be noted that panel 36 should not extend fully across the corresponding side of the cooking cavity 20, so as to allow for air from the fan 30 to flow around the panel 36 into the cooking cavity 20, preferably on at least the top, front, and rear edges of panel 36. Thus, flow from the fan 30 is generally constrained to flow into the cooking cavity 20 via the gaps between shroud 32 and panel 36.

The present invention advantageously routes at least some of the recirculation gases through the steam chamber 40 to heat and/or moisten them. Referring to FIG. 3, the primary recirculation path is shown at 110. This primary recirculation path 110 extends from the cooking cavity 20, through inlet 52 (holes 72 in secondary portion 70 of baffle 60) to the steam collecting area 50, substantially across the steam collecting area 50, through the outlet 54, through the duct 80 to the fan 30, and back to the cooking cavity 20. One aspect of this primary recirculation path 110 is that the recirculation gases move across the steam collecting area 50, receiving heat and/or moisture therefrom. In addition, the location of the primary recirculation inlet 52 to the steam collecting area 50 on the side opposite the fan 30 and low in the cooking cavity 20 helps promote both good circulation of the steam 5 throughout the cooking cavity 20 and movement of cooler gases that might otherwise collect at the bottom of the cooking cavity 20. In order to further promote this latter effect, the rim 66 of the baffle 60 may optionally include some secondary holes 68 that allow steam 5 from the lower portion of the cooking cavity 20 to be pulled into the steam collecting area 50.

In addition to the primary recirculation path 110, there may advantageously be a secondary recirculation path as shown in FIG. 3 at 120. The secondary recirculation path 120 mimics the recirculation path of the prior art in that it extends from the main cavity 20, to the fan 30 via openings 34 and back to the main cavity 20. It is intended that the steam 5 from the secondary recirculation path 120 will mix with steam 5 from the primary recirculation path 110 at the fan 30. If the secondary recirculation path 120 is present, it may be advantageous to size the openings in panel 36, 34 (e.g., opening 34, etc.) such that the ratio of flow rates between the primary recirculation path 110 and the secondary recirculation path 120 is generally in the range of 3:5 to 2:1, and more particularly about 5:3. Of course, the target ratio may vary depending on the size of the cooking cavity 20 and the size (cfm rating) of the fan 30.

The basic operation of the steam oven 10 may be described as follows. The steam oven 10 initially has a pool of water in the pool area 42. The food is placed in the cooking cavity 20 and the door 12 is closed. The heating elements 16 are turned on and the water in the pool area 42 is heated, eventually generating steam 5. The fan 30 is run to force recirculation through the steamer 10. The fan 30 pulls gases from the cooking cavity 20 along the primary recirculation path 110 through the steam collecting area 50 and up the duct 80. As the gases pass through the steam collecting area 50, they are heated and/or moistened by contact with the steam 5 in the steam collecting area 50. The fan 30 then mixes the steam-laden gases from the primary recirculation path 110 with the gases from the optional secondary recirculation path 120, and expels the mixture into the cooking cavity 20. After passing by the food, the gases following the primary recirculation path 110 then reenter the steam chamber 40 via the holes 72. Cooler air in the cooking cavity 20 should tend to move toward the bottom of the cooking cavity 20; with the holes 72 located proximate the floor of the cooking cavity 20, this cooler air should be collected into the primary recirculation flow and forced through the steam chamber 40 for heating by the steam 5 therein.

Merely by way of example, a steam oven 10 of the present invention can be built using a generally rectangular cooking cavity 20 with dimensions of 13½ inches wide by 22 inches deep by 10 inches high resulting in a volume of approximately 1.7 cubic feet; a steam chamber of general dimensions 13½ inches wide by 22 inches deep by 3½ inches high having a pool area 42 holding approximately 2 gallons in a 2 inch depth and a steam collecting area of approximately 1½ inch height; a baffle 60 having a main section 62 of approximately 13½ inches wide by 18 inches deep and twenty-eight primary holes 72 of ⅜×¼ inch obround and ten secondary holes 68 of ⅜×¼ obround; a centrifugal fan 30 with a rating of approximately 175 cfm; a duct 80 having a typical cross-section of generally 7 in$^2$; an opening 34 of 5 inch diameter; and six main heating elements 16 of 1500 watts. Such an arrangement is believed to have a ratio of airflow between the primary recirculation path 110 and the secondary recirculation path 120 of approximately 5:3.

It should be understood that the discussion above has focused on those areas relevant to one of ordinary skill in the art to understand and practice the present invention, and some related features. However, the discussion above has omitted several details of the steamer 10 not relevant to understanding the present invention, as these details are understood by one of ordinary skill in the art without explicit explanation thereof. For instance, the pool area 42 may advantageously include a drain (not shown) to allow the water in the pool area 42 to be drained for cleaning. Likewise, the heating elements 16 may alternatively be located in the pool area 42, rather than underneath the pool area 42 as shown in FIG. 3. The heating elements 16 may include a plurality of main heating elements 16 and an optional idle heating element. Heating elements 16 may come in a variety of shapes and sizes. In the preferred embodiment, each heating element 16 is a rectangular shaped block of aluminum with an embedded electrical resistance core. A plurality of these heating elements 16 are attached to the underside of the steam chamber 40. Optionally, a compressible heat transfer layer (not shown) may be used, as disclosed in U.S. Pat. No. 5,968,388, which is incorporated herein by reference. It should be noted that other heating element arrangements are encompassed by the present invention, including but not limited to common electrical resistance heaters, film resistance heaters, induction heaters, and gas heaters. Also, safety temperature limit switches (not shown) may be associated with the heating elements 16, as is known in the art.

The discussion above has used water as an illustrative fluid in the pool area for generating steam. It should be understood that pure water is not required; for instance, suitable agents may be added to the water to help prevent scaling, as is known in the art. As such, the term "water" as used herein is meant to encompass any fluid that may be used generate a hot vapor (called "steam" herein) suitable for contact with food.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A convection steam cooking device, comprising:
   a cooking cavity and a fan operatively communicating with said cooking cavity;
   a steam chamber disposed beneath said cooking cavity and having a lower pool area for holding water therein and an upper steam collecting area, said steam chamber operatively connected between said cooking cavity and said fan along a primary recirculation path, said primary recirculation path extending from said main cavity, through said steam collecting area, to said fan, and back to said main cavity;
   a baffle disposed between said cooking cavity and said steam chamber.

2. The device of claim 1 wherein said steam chamber includes an inlet disposed away from said fan and an outlet disposed toward said fan.

3. The device of claim 2 wherein said primary recirculation path extends from said main cavity, through inlet to said steam collecting area, substantially across said steam collecting area, through said outlet to said fan, and back to said main cavity.

4. The device of claim 2 further comprising a generally vertically extending duct operatively disposed between said outlet and said fan.

5. The device of claim 4 wherein said primary recirculation path extends from said main cavity, through inlet to said steam collecting area, substantially across said steam collecting area, through said outlet, through said duct to said fan, and back to said main cavity.

6. The device of claim 1 wherein said baffle at least partially defines said inlet and said outlet of said steam chamber.

7. The device of claim 1 wherein said baffle substantially forms a floor for said cooking chamber.

8. The device of claim 1 wherein said baffle comprises a removable baffle that allows access by a user from said cooking cavity to at least a portion of said steam chamber when removed.

9. The device of claim 1 wherein said baffle includes a secondary section remote from said fan and a generally flat section disposed between said secondary section and said fan.

10. The device of claim 9 wherein said secondary section is disposed at an upward angle with respect to said generally flat section.

11. The device of claim 1 further including a secondary recirculation path from said cooking cavity to said fan and back to said cooking cavity, without passing through said steam chamber.

12. The device of claim 1 further comprising an exhaust connecting said cooking cavity to atmosphere, said exhaust comprising an exhaust duct and a cap moveably engaging said exhaust duct, wherein said cap is operative to limit pressures in said cooking chamber to not more than slightly above atmosphere.

13. The device of claim 1 wherein:
said steam collecting area is disposed directly above said pool area and directly below said cooking cavity;
said pool area has a horizontal cross-sectional area; and
wherein said steam collecting area has a horizontal cross-sectional area substantially equal to said horizontal cross-sectional area of said pool area.

14. The device of claim 1 wherein there is substantially unrestricted flow from said pool area to said steam collecting area.

15. The device of claim 1:
wherein said baffle comprises a removable baffle, said baffle at least partially defining an inlet to said steam chamber disposed away from said fan and an outlet from said steam chamber disposed toward said fan; said baffle including a secondary section remote from said fan and a generally flat section disposed between said secondary section and said fan; said secondary section disposed at an upward angle with respect to said generally flat section;
further comprising a generally vertically extending duct operatively disposed between said outlet and said fan; wherein said primary recirculation path extends from said main cavity, through inlet to said steam collecting area, substantially across said steam collecting area, through said outlet, through said duct to said fan, and back to said main cavity;
and wherein:
said steam collecting area is disposed directly above said pool area and directly below said cooking cavity;
said pool area has a first horizontal cross-sectional area; and
said steam collecting area has a horizontal cross-sectional area substantially equal to said first horizontal cross-sectional area of said pool area; and
substantially unrestricted access exists from said pool area to said steam collecting area.

16. The device of claim 11 wherein a ratio of a flow rate along said primary recirculation path to a flow rate along said secondary recirculation path is in the range of about 3:5 to about 2:1.

17. The device of claim 16 wherein said ratio is approximately 5:3.

18. A method of treating food with steam, comprising:
generating steam in a steam chamber disposed beneath a main cooking cavity, said steam chamber having a having a lower pool area for holding water therein and an upper steam collecting area;
routing said steam from said steam collecting area to said main cooking cavity along at least a portion of a primary recirculation path, said primary recirculation path extending from said main cooking cavity, through said steam collecting area, to a fan, and back to said main cavity; and
forcing, by a fan, recirculation of said steam along said primary recirculation path so that gases from said main cooking cavity flow through said steam collecting area to be enhanced therein;
providing a baffle between said main cooking cavity and said steam chamber that helps define a lower boundary of said cooking cavity and an upper portion of said steam chamber.

19. The method of claim 1 wherein said baffle includes a plurality of holes disposed away from said fan, and wherein forcing recirculation of said steam along said primary recirculation path comprises routing gases from said cooking cavity through said holes of said baffle to said steam collecting area, through said steam collecting area, to said fan, and back to said main cavity.

20. The method of claim 18 wherein said baffle comprises a secondary section remote from said fan and a generally flat section disposed between said secondary section and said fan, and further comprising catching drippings from the food in said cooking cavity in said generally flat section.

21. The method of claim 18 wherein said baffle is removable and further comprising removing said baffle to allow access by a user from said cooking cavity to at least a portion of said steam chamber.

22. The method of claim 18 further comprising enhancing said gases from said main cooking cavity in said steam collecting area by adding moisture thereto.

23. The method of claim 18 further comprising enhancing said gases from said main cooking cavity in said steam collecting area by adding heat thereto.

24. The method of claim 23 wherein enhancing said gases from said main cooking cavity in said steam collecting area further comprises adding moisture thereto.

25. The method of claim 18 wherein said generating steam comprises heating water in said pool area and allowing substantially unrestricted flow from said pool area to said steam collecting area.

26. The method of claim 18 wherein said primary recirculation path includes a generally vertically extending duct disposed between said steam chamber and said fan.

27. The method of claim 18 further comprising forcing recirculation along a secondary recirculation path, said secondary recirculation path extending from said cooking cavity to said fan and back to said cooking cavity, without passing through said steam chamber.

28. The method of claim 27 wherein a ratio of a flow rate along said primary recirculation path to a flow rate along said secondary recirculation path is in the range of about 3:5 to about 2:1.

29. The device of claim 28 wherein said ratio is approximately 5:3.

30. A method of treating food with steam, comprising:
generating steam in a steam chamber disposed beneath a main cooking cavity, said steam chamber having a having a lower pool area for holding water therein and an upper steam collecting area, wherein said generating steam comprises heating water in said pool area and allowing substantially unrestricted flow from said pool area to said steam collecting area;
providing a fan in communication with said cooking cavity and said steam chamber;
providing a baffle between said main cooking cavity and said steam chamber that helps define a lower boundary of said cooking cavity and an upper portion of said steam chamber; said baffle including a secondary section remote from said fan, a generally flat section disposed between said secondary section and said fan, and a plurality of holes disposed away from said fan;
routing said steam from said steam collecting area to said main cooking cavity along at least a portion of a primary recirculation path, said primary recirculation path extending from said main cooking cavity, through said holes in said baffle to said steam collecting area, to said fan, and back to said main cavity;
forcing, by said fan, recirculation of said steam along said primary recirculation path so that gases from said main cooking cavity flow through said steam collecting area to be enhanced therein; and
wherein enhancing said gases from said main cooking cavity in said steam collecting area comprises adding at least one of moisture and heat thereto.

31. The method of claim 30 wherein said primary recirculation path includes a generally vertically extending duct disposed between said steam chamber and said fan.

32. The method of claim 30 wherein said baffle is removable and further comprising removing said baffle to allow access by a user from said cooking cavity to at least a portion of said steam chamber.

* * * * *